Sept. 22, 1964  M. B. BLEECKER  3,149,735
LAUNCHING DEVICE FOR BOAT TRAILERS
Filed June 22, 1962
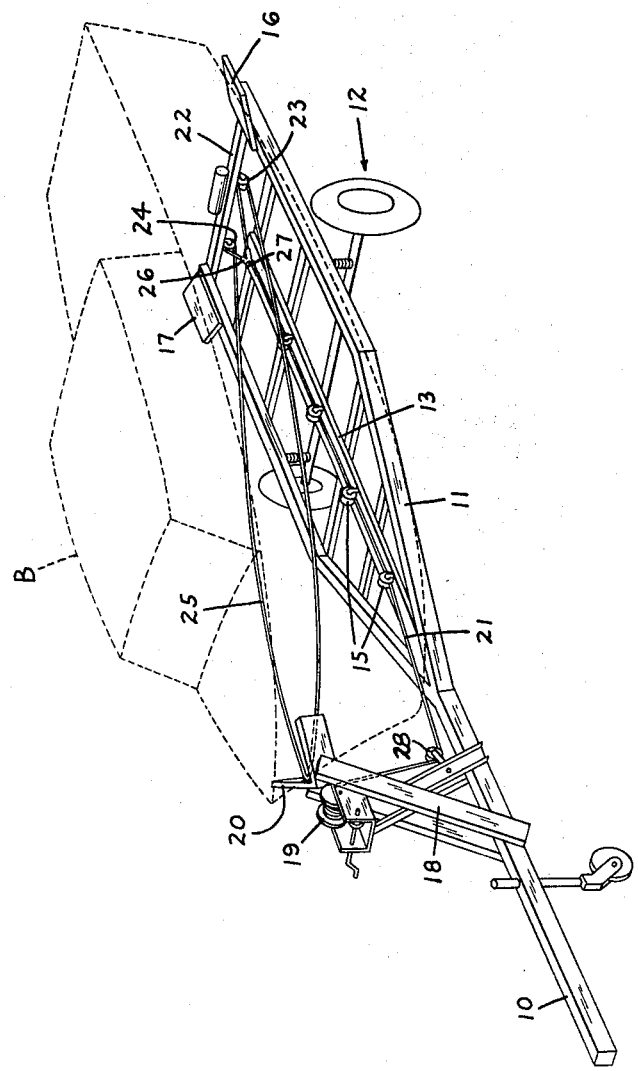
INVENTOR
MAITLAND B. BLEECKER
BY
HIS ATTORNEYS 3,149,735
LAUNCHING DEVICE FOR BOAT TRAILERS
Maitland B. Bleecker, West Milford Township, Passaic
County, N.J. (Box 114, Wanaque, N.J.)
Filed June 22, 1962, Ser. No. 204,331
2 Claims. (Cl. 214—85.5)

This invention relates to improvements in boat trailers and more particularly to boat launching devices for boat trailers of the type which are capable of handling relatively heavy portable sailboats, outboard cruisers, motorboats and the like.

Boat trailers usually are provided with a winch, keel guide and keel guide rollers, cradles and the like which facilitate the loading of a boat on to the trailer and secure and support the boat while it is being transported on the trailer. By the use of a suitable winch and the guiding devices mentioned, even a relatively large boat can be loaded on a trailer when the trailer is backed into the water, and immersed a sufficient distance to allow the bow of the boat to be floated over the rear cross member of the trailer. However, no means is currently available to enable the launching of relatively large boats from the boat trailers without backing the trailer down a boat launching ramp and immersing it to a sufficient depth to enable the boat to be floated from the trailer. However, in many locales, ramps and other facilities are not available which permit the trailer to be parked into the water far enough to enable the boat to be floated from the trailer. In these conditions a large number of people and a great deal of effort is required to lift and push the boat from the trailer.

In accordance with the present invention, I have developed a boat launching system which enables a boat to be unloaded from a trailer with no greater difficulty than loading the boat on to the trailer even under conditions where the depth of the water or an abrupt drop off of the shore line prevents the trailer from being immersed sufficiently to float the boat off of the trailer.

More particularly, in accordance with the present invention I have provided a system including a bridle which is passed around the bow of the boat and through guides such as the pulleys, eyes or other similar devices near the back of the trailer and connected to the winch cable to enable the boat trailer winch to be used to drag the boat towards the rear of and launch it from the trailer. With my launching device, one man can launch even a large boat from a trailer under conditions where it would have been impossible for him to launch the boat without assistance.

For a better understanding of the present invention, reference may be had to the accompanying drawing in which the single figure discloses schematically a typical boat trailer with a boat thereon shown in dotted lines and including the launching system of the present invention.

The invention may be applied to substantially any suitable type of trailer for transporting boats, such as inboard and outboard powered boats, cabin cruisers, sailboats and the like. For purposes of illustration, a typical trailer includes a tongue 10 which may be provided with a trailer hitch (not shown) to enable it to be towed by a passenger car or the like. The tongue extends forwardly from a frame 11 supported by the running gear 12 of the trailer which may be of the single or multiple axle type as desired. Also as illustrated, the frame includes a keel guide member 13 provided with keel guide rollers 15 and near its rear with cradles 16 and 17 which engage the under surface of the hull of the boat and thereby support and stabilize it on the trailer. Also at the front of the trailer is mounted a winch stand 18 provided with a winch 19 and a bow rest 20. The winch 19 is illustrated as being of the hand-cranked type but it can be electrically or power driven as desired. Other cradles may be provided along the length of the frame in the case of the larger and heavier load carrying trailers and the cradles may be provided with rollers to facilitate loading and launching the boat B from the trailer. The winch 19 is provided with a cable 21 which is adapted to be connected to an eye or other member on the bow of the boat so that when the winch is operated, the boat can be pulled up on to the trailer and supported thereby.

In accordance with the present invention, the rear cross member 22 or a similar structural element of the trailer frame is provided with guides such as a pair of pulleys 23 and 24 which support a bridle 25 formed of cable, rope or the like. The bridle 25 passes around the bow of the boat B, preferably supported by resting upon or being attached to the bow eye of the boat, along its sides, around the pulleys 23 and 24 and is provided with metallic or spliced eyes or a yoke 26 which is detachably engageable with the hook 27 on the winch cable 21. In launching the boat, the winch cable is passed under the keel rollers 15 along the keel guide and the hook 27 is connected to the yoke 26 of the bridle 25. Also the winch cable 21 may be passed under a pulley 28 mounted at the lower end of the winch stand 18 to guide the cable under the keel of the boat. With the bridle 25 connected to the winch cable 21, the trailer may be backed into or close to the water in an area where the water is deep enough to float the boat after it has been launched from the trailer. The winch 19 is operated to wind up the winch cable 21 thereby pulling the yoke 26 forwardly and at the same time drawing rearwardly the portion of the bridle 25 extending around the boat B. The hook 27 and the yoke 26 are of suitable size to enable them to pass under the keel guide rollers so that the boat can be pulled completely off the back of the trailer while being guided on the keel guide rollers and the cradles. This operation can be accomplished even though the boat is not floating in the water and in the case of trailers which have roller type cradles, the boat can even be unloaded from the trailer when the boat is not immersed at all in the water. The new launching system thus satisfies requirements where the boat launching area is such that the trailer cannot be driven into the water to any substantial depth because of a gradually sloping beach or a sudden drop off or the like.

When the boat is to be loaded on the trailer, the bridle 25 is unhooked from the winch cable and the latter is then hooked to the bow eye of the boat and the boat is drawn back on to the trailer by operation of the winch 19. In some instances, it may be desirable to run the bridle 25 through an eye in the bow of the boat or provide it with a snap hook to be connected to the eye in the bow so that when the boat is launched it is still attached to the trailer and cannot float away.

It will be understood that the launching system described can be applied to many types and sizes of boat trailers. It is further understood that, while the use of a bridle is desirable in order that large boats may be moved rearwardly for launching without the boat tending to yaw sideways and bind or jam on the trailer rollers, smaller and lighter boats, being easier to move rearwardly on the trailer, would not necessarily need a bridle but could be successfully launched with a single cable or line in place of the bridle positioned roughly parallel to the keel but slightly off to one side so as not to interfere with the keel rollers.

From the foregoing description, it will be apparent that a simple yet effective boat launching system is provided and that the boat launching device is susceptible to modification and adaptation to many forms of boat trailers.

Accordingly, it will be understood that the form of the invention disclosed herein is illustrative and that the invention is not limited save as defined in the following claims.

I claim:

1. A system for launching a boat from a boat trailer having running gear, a frame mounted on said running gear for supporting a boat thereon and having a cross-member adjacent to the rear end of said frame, a tongue extending from the front end of said frame and a winch mounted on said tongue and having a cable windable thereon, said system comprising a pair of guide members on said cross-member in spaced apart relation transversely of said frame, a bridle having a portion adapted to extend around the bow of a boat on said frame and other portions extending rearwardly along the opposite sides of said boat through said guide members, and then forwardly toward said winch, and means for connecting said winch cable to said forwardly extending portions of said bridle to pull the latter through said guide members and move the boat toward the rear end of said frame, said bridle comprising a cable having its opposite ends connected to each other and detachably connected to said winch cable.

2. A system for launching a boat from a boat trailer having running gear, a frame mounted on said running gear for supporting a boat thereon and having a cross-member adjacent to the rear end of said frame, a tongue extending from the front end of said frame and a winch mounted on said tongue and having a cable windable thereon, said system comprising a pair of guide members on said cross-member in spaced apart relation transversely of said frame, a bridle having a portion adapted to extend around the bow of a boat on said frame and other portions extending rearwardly along the opposite sides of said boat through said guide members, and then forwardly toward said winch, a yoke and hook on said winch cable and bridle for connecting said winch cable to said forwardly extending portions of said bridle to pull the latter through said guide members and move the boat toward the rear end of said frame.

References Cited in the file of this patent

UNITED STATES PATENTS

| | | |
|---|---|---|
| 1,561,157 | Greer | Nov. 10, 1925 |
| 2,827,188 | Reeder | Mar. 18, 1958 |
| 2,850,188 | Evjen | Sept. 2, 1958 |
| 2,925,929 | Romine | Feb. 23, 1960 |